United States Patent
Sanchez et al.

(10) Patent No.: US 10,642,701 B2
(45) Date of Patent: May 5, 2020

(54) RELEASING SPACE ON SECONDARY STORAGE DEVICE FOR RESYNCHRONIZATION

(71) Applicant: International Business Machines Corporation, Armonk, NY (US)

(72) Inventors: Matthew Sanchez, Tucson, AZ (US); Carol S. Mellgren, Tucson, AZ (US); Theresa M. Brown, Tucson, AZ (US); Gregory E. McBride, Vail, AZ (US); Nicolas M. Clayton, Warrington (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 56 days.

(21) Appl. No.: 16/124,372

(22) Filed: Sep. 7, 2018

(65) Prior Publication Data

US 2020/0081803 A1 Mar. 12, 2020

(51) Int. Cl.
*G06F 11/16* (2006.01)
*G06F 11/20* (2006.01)
*G06F 3/06* (2006.01)

(52) U.S. Cl.
CPC ......... *G06F 11/1662* (2013.01); *G06F 3/065* (2013.01); *G06F 3/067* (2013.01);
(Continued)

(58) Field of Classification Search
CPC ............. G06F 11/1662; G06F 11/2097; G06F 3/0619; G06F 3/0644; G06F 3/065; G06F 3/0665; G06F 3/067
See application file for complete search history.

(56) References Cited

U.S. PATENT DOCUMENTS 8,239,648 B2 8/2012 Goebel et al.
8,819,362 B1 * 8/2014 Duprey ............... G06F 11/2069
711/161
(Continued)

FOREIGN PATENT DOCUMENTS

WO 2011106068 A1 9/2011

OTHER PUBLICATIONS

Arun Raman, "NetApp Thin Provisioning Improving Storage Utilization and Reducing TCO", Network Appliance, Inc., May 2007, pp. 1-19.

*Primary Examiner* — Tracy C. Chan
(74) *Attorney, Agent, or Firm* — Kunzler Bean & Adamson, PC (57) ABSTRACT

Methods and systems for releasing space on a secondary storage device for resynchronization are provided. A system for releasing space on a secondary storage device for resynchronization includes a suspension detection module that determines that the relationship between a primary computing device and a secondary computing device is suspended. The system also includes a relationship resumption module that determines that the relationship between the primary computing device and a secondary computing device is resumed. The system further includes an extent release module that directs the secondary computing device to release extents in a secondary storage device of the secondary computing device that correspond to free extents in a primary storage device of the primary computing device. Additionally, the system includes a synchronization module that synchronizes data stored on the secondary storage device and the primary storage device.

20 Claims, 5 Drawing Sheets

(52) U.S. Cl.
CPC .......... *G06F 3/0619* (2013.01); *G06F 3/0644* (2013.01); *G06F 3/0665* (2013.01); *G06F 11/2097* (2013.01)

(56) References Cited

U.S. PATENT DOCUMENTS

| | | | |
|---|---|---|---|
| 9,558,111 B1* | 1/2017 | Balcha | G06F 12/0253 |
| 2007/0168713 A1* | 7/2007 | Kern | G06F 11/2064 |
| | | | 714/12 |
| 2008/0172429 A1* | 7/2008 | Lin | G06F 16/2343 |
| 2010/0082715 A1 | 4/2010 | Dohm et al. | |
| 2017/0300243 A1* | 10/2017 | Diel | G06F 3/065 |
| 2018/0270290 A1* | 9/2018 | Sinha | G06F 11/2082 |

* cited by examiner

RELEASING SPACE ON SECONDARY STORAGE DEVICE FOR RESYNCHRONIZATION

FIELD

This invention relates to replicating data and more particularly relates to methods and systems for releasing space on a secondary storage device for resynchronization.

BACKGROUND

In some systems for storing data, peer-to-peer remote copy (PPRC) may be used to replicate data stored on a primary storage device onto a secondary storage device. To maintain the replication of the data on the primary storage device and secondary storage device, computing devices that control the primary and secondary storage devices may be in communication with one another to maintain synchronization of the data stored on the separate storage devices. However, at times the communicative relationship between the primary and secondary storage devices may become suspended for any of multiple reasons. During the suspension, certain operations performed on the data stored in the primary storage device may not be replicated on the secondary storage device upon resumption of the communicative relationship.

SUMMARY

Methods and systems for releasing space on a secondary storage device for resynchronization are provided. A system for releasing space on a secondary storage device for resynchronization includes a suspension detection module that determines that the relationship between a primary computing device and a secondary computing device is suspended. The system also includes a relationship resumption module that determines that the relationship between the primary computing device and a secondary computing device is resumed. The system further includes an extent release module that directs the secondary computing device to release extents in a secondary storage device of the secondary computing device that correspond to free extents in a primary storage device of the primary computing device. Additionally, the system includes a synchronization module that synchronizes data stored on the secondary storage device and the primary storage device.

In some embodiments, the extent release module is further configured to release extents in the primary storage device in response to the relationship being suspended. Also, the extent release module is configured to reset one or more extent records associated with the released extents in the primary storage device. Further, an extent record in the one or more extent records indicates that an extent on the primary storage device is out-of-synchronization with a corresponding extent on the secondary storage device.

In certain embodiments, the extent release module dispatches an asynchronous thread to release the extents in the secondary storage device. Further, the synchronization module synchronizes the data stored on the secondary storage device and the primary storage device upon execution completion of the asynchronous thread. Also, extents on the primary storage device in the secondary storage device may be thin provisioned.

One method includes determining that a relationship between a primary computing device and a secondary computing device is suspended. The method also includes determining that the relationship between the primary computing device in a secondary computing device is resumed. Further, the method includes directing the secondary computing device to release extents in a secondary storage device of the secondary computing device that correspond to free extents in a primary storage device of the primary computing device. Additionally, the method includes synchronizing data stored on the secondary storage device and the primary storage device.

In some embodiments, the method further includes releasing extents in the primary storage device in response to the relationship being suspended. Also, the method includes resetting one or more extent records associated with the released extents in the primary storage device. Further, an extent record in the one or more extent records indicates that an extent on the primary storage device is out-of-synchronization with a corresponding extent on the secondary storage device.

In certain embodiments, the method further includes dispatching an asynchronous thread to release the extents in the secondary storage device. Further, the method further includes synchronizing the data stored on the secondary storage device and the primary storage device upon execution completion of the asynchronous thread. Also, data stored on the extents on the primary storage device and the secondary storage device are associated with thin provisioned volumes.

Also, disclosed are computer program products comprising a computer-readable storage medium including program instructions embodied therewith for releasing space on a secondary storage device for resynchronization. Some program instructions executable by a processor can cause the processor to determine that a relationship between a primary computing device and a secondary computing device is suspended. Further, the program instructions cause the processor to determine that the relationship between the primary computing device and the secondary computing device is resumed. Also, the program instructions cause the processor to direct the secondary computing device to release extents in a secondary storage device of the secondary computing device that correspond to free extents in a primary storage device of the primary computing device. Additionally, the program instructions cause the processor to synchronize data stored on the secondary storage device and the primary storage device.

In some embodiments, the program instructions further cause the processor to release extents in the primary storage device in response to the relationship being suspended. Also, the program instructions cause the processor to reset one or more extent records associated with the released extents in the primary storage device. Further, an extent record in the one or more extent records indicates that an extent on the primary storage device is out-of-synchronization with a corresponding extent on the secondary storage device.

In certain embodiments, the program instructions cause the processor to dispatch an asynchronous thread to release the extents in the secondary storage device. Further, the program instructions cause the processor to synchronize the data stored on the secondary storage device and the primary storage device upon execution completion of the asynchronous thread.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Disclosed herein are various embodiments providing methods, systems, and computer program products that can select locations on a storage device based on characterizations of adjacent location errors. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several storage devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure below may refer to elements of proceeding figures. For instance, like numbers can refer to similar elements in all figures, including alternate embodiments of similar elements.

Figure 1:
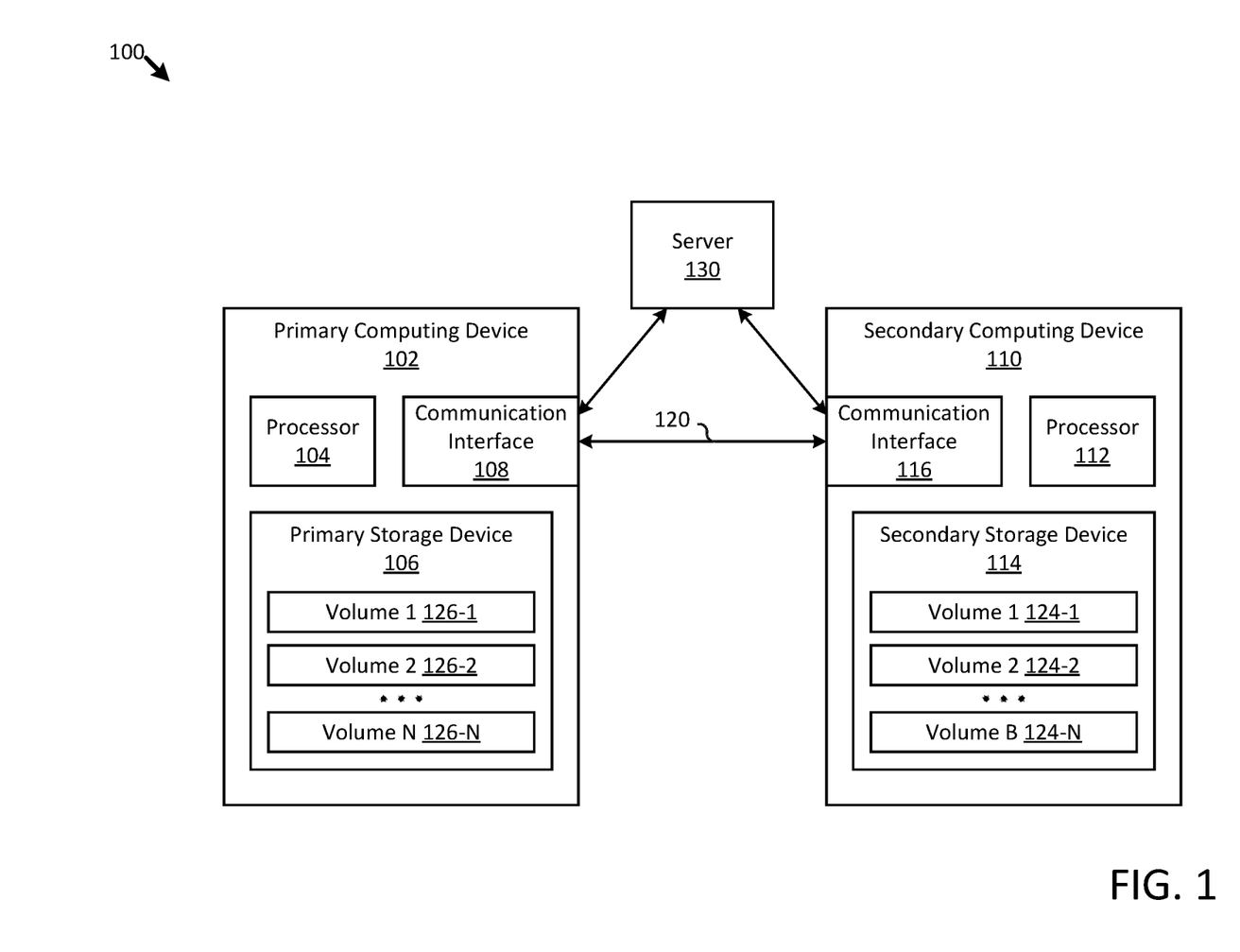
FIG. 1 is a block diagram of one embodiment of a computing system for releasing space on a secondary storage device for resynchronization.

With reference now to the figures, FIG. 1 is a block diagram of one embodiment of a computing system 100 for releasing space on a secondary storage device 114 for resynchronization. At least in the illustrated embodiment, the computing system 100 may include, among other components, a primary computing device 102 and a secondary computing device 110. As used herein, a computing device, such as the primary computing device 102 and the secondary computing device 110, may refer to any device controllable through the execution of computer readable instructions. For example, a computing device may be a desktop computer, a server, a laptop, a mobile device, and the like.

In certain embodiments, the primary computing device 102 may include a communication interface 108 and the secondary computing device 110 may include a communication interface 116. The communication interface 108 may communicate with the communication interface 116 through a connection 120. The connection 120 between the primary computing device 102 and the secondary computing device 110 may be a wired connection, a wireless connection, a personal area network connection, a local area network connection, a wide area network connection, or any combination thereof, and may include various communication protocols and hardware. Alternatively, the communication interface 108 and the communication interface 116 may communicate with a server 130, where the server 130 may coordinate the operation of the primary computing device 102 with the operation of the secondary computing device 110.

In some embodiments, the primary computing device 102 may include a processor 104. The processor 104 may be a device capable of executing computer readable instructions and directing the operation of the primary computing device 102. For example, the processor 104 may be a single core processor, a multi-core processor, a microcontroller, or other device capable of executing computer readable instructions and directing the operation of the primary computing device. Further, the secondary computing device 110 may include a processor 112. The processor 112 may function in a similar manner as the processor 104 on the primary computing device 102. Accordingly, the processor 112 may direct the operation of the secondary computing device 110.

In additional embodiments, the primary computing device 102 may include a primary storage device 106 and the secondary computing device 110 may include a secondary storage device 114. Both the primary storage device 106 and the secondary storage device 114 may be any suitable type of storage device that is known or developed in the future that can store computer-usable data. In various embodiments, the primary storage device 106 and the secondary storage device 114 may each include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with the computing device such as the primary computing device 102 and the secondary computing device 110. In alternative embodiments, there may be additional computing devices in communication with the primary computing device 102 and the secondary computing device 110.

In certain embodiments, the primary storage device 106 and the secondary storage device 114 may be implemented as a direct-access storage devices (DASD). The primary storage device 106 and the secondary storage device 114, in further embodiments, may include non-transitory memory such as, for example, flash memory (e.g., a solid-state device (SSD) or other non-volatile storage devices that store persistent data), a dynamic random access memory (DRAM) device, an enhanced dynamic random access memory (EDRAM) device, a static random access memory (SRAM) device, a hard disk drive (HDD), a near-line drive, tape drive (e.g., magnetic and/or virtual), and/or other type(s) (e.g., non-volatile and/or persistent) of memory devices, etc. that are possible and contemplated herein. In some embodiments, one or both of the primary storage device 106 and the secondary storage device 114 may be a cluster of separate storage devices that are configured to store data.

In various embodiments, the primary storage device 106 and the secondary storage device 114 may include non-volatile/persistent hardware and/or software configured to perform long-term data storage operations, including, but not limited to, data archiving, data backup, data mirroring, replicating data, etc. For instance, the primary storage device 106 and the secondary storage device 114 may include non-volatile and/or persistent hardware and/or software to perform long-term data storage operations, which may include write operations, read operations, read-write operations, etc., among other operations.

In certain embodiments, the primary computing device 102 may be in a communicative relationship with the secondary computing device 110. As used herein, a relationship between separate computing devices may indicate that the secondary computing device 110 performs an action in response to an action performed on the primary computing device 102. For example, when data is stored on the primary storage device 106 on the primary computing device 102 the data may also be stored on the secondary storage device 114 on the secondary computing device 110. In some embodiments, data stored on the primary storage device 106 may be synchronized with the data stored on the secondary storage device 114, such that the data stored on the primary storage device 106 is replicated on the secondary storage device 114.

In some embodiments, data may be stored on the primary storage device 106 and the secondary storage device 114 in association with different volumes. As illustrated, data stored on the primary storage device 106 may be associated with separate volumes 126-1-126-N, herein referred to as volumes 126. In a similar manner, data stored in the secondary storage device 114 may be associated with separate volumes 124-1-124-N, herein referred to as volumes 124. In some embodiments, a particular volume 126 stored on the primary storage device 106 may be replicated on a particular volume 124 stored on the secondary storage device 114. For example, data stored on the volume 126-1 may be replicated on the volume 124-1, data stored in the volume 126-2 may be replicated on the volume 124-2, and data stored on the volume 126-N may be replicated on the volume 124-N.

In certain embodiments, volumes 126 and volumes 124 may be thin provisioned volumes. As used herein, a thin-provisioned volume may refer to a logical representation of storage space on a storage device that is available for use by a potential consumer or an application. However, space on the storage device does not become allocated for the potential consumer or the application, until the consumer or application needs allocated storage space for saving data. Storage space that is not allocated may be aggregated together such that the storage space in the unallocated portions of memory is available to multiple volumes. For example, the primary storage device 106 may have one TB of available storage space. The processor 104 may control how much storage space is available to each of the separate volumes 126 on the primary storage device 106. For instance, 150 GB may be available for the volume 126-1, 250 GB may be available for the volume 126-2, 200 GB may be available for the volume 126-N, and 400 GB may be reserved as free space. However, there may be no initial storage space allocated for the data associated with one of the volumes 126. Data is allocated to the volumes 126 as needed by the volumes 126. As such, initially, while data may be available for the respective volumes 126, it is not allocated to the respective volumes 126.

In some embodiments, storage space may be allocated by assigning extents on the primary storage space to one of the volumes 126. As used herein, an extent may refer to a contiguous area of storage in a file system. For example, an extent may refer to a range of memory space on the primary computing device 102. As an application or user associated with a volume 126 uses an increased amount of data, the processor 104 may assign extents to the associated volume 126. Further, as a volume 126 no longer uses the memory that is allocated to the volume 126, surplus extents may be released back into a free pool of assignable extents.

In certain embodiments, the provisioning of extents to different volumes 126 may be replicated by the provisioning of extents to different volumes 124 on the secondary storage device 114. For example, the primary computing device 102 and the secondary computing device 110 may be part of a Peer-to-Peer Remote Copy (PPRC) relationship. In certain implementations, a PPRC relationship may provide a hardware-based disaster recovery solution that maintains a mirror image of application data at a remote secondary location. In particular, data is migrated from the primary storage device 106 to the secondary storage device. PPRC mechanisms may automatically copy changes that are made to the primary storage device 102 to the secondary storage device 114 until the PPRC relationship is suspended or terminated.

In some embodiments, when the relationship between the primary computing device 102 and the secondary computing device 110 becomes suspended, the relationship may resume after a time. After resuming the relationship, the secondary storage device 114 may become resynchronized with the primary storage device 106. However, during the suspension, allocated extents on the primary storage device 106 may become released. Upon resynchronization, the secondary computing device 110 may be unaware of released extents on the primary storage device 106. Accordingly, the secondary computing device 110 may synchronize data stored on the secondary storage device 114 with the data stored in the primary storage device 106 but the extents that are now free on the primary storage device 106 may still be allocated to one or more of the volumes 124 and unavailable for reallocation.

In certain embodiments, upon resumption of a communicative relationship between the primary computing device 102 and the secondary computing device 110, but before resynchronization, the processor 104 and the processor 112 may execute threads that cause the secondary computing device 110 to release extents on the secondary storage device 114 that correspond with free extents on the primary storage device 106. Upon completion of the thread for releasing free extents, the primary computing device 102 and the secondary computing device 110 may resynchronize the data stored on the primary storage device 106 with the data stored on the secondary storage device 114.

Figure 2:
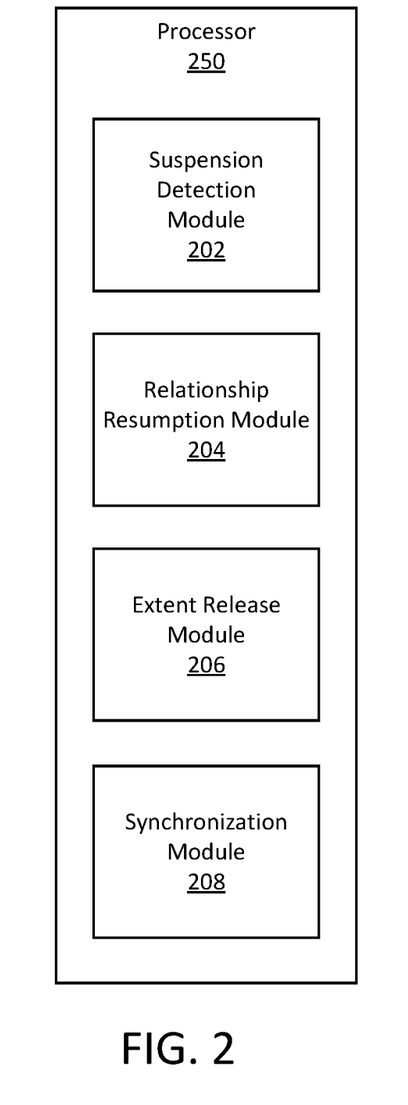
FIG. 2 is a block diagram illustrating one embodiment of a processor configured to release space on a secondary storage device for resynchronization.

FIG. 2 is a block diagram illustrating one embodiment of a processor 250 configured to release space on a secondary computing device 110 before resynchronization of the data on the primary storage device 106 with the data on the secondary storage device 114. In certain embodiments, as used herein, the processor 250 may be a general-purpose computer, special purpose computer, multiple processors, or other programmable data processing apparatus. In some embodiments, the processor 250 may be a processor 104 that executes on the primary computing device 102, the secondary computing device 110, the server 130, or any combination of the primary computing device 102, the secondary computing device 110, and the server 130. For example, the processor 250 may be implemented in one or both of the processor 104 and the processor 112. In the depicted embodiment, the processor 250 may include a suspension detection module 202, a relationship resumption module 204, an extent release module 206, and a synchronization module 208. As described herein, the suspension detection module 202 may determine that a relationship between a primary computing device 102 and a secondary computing device 110 is suspended. Further, as described herein, the relationship resumption module 204 may determine that the relationship between the primary computing device 102 and the secondary computing device 110 is resumed. Also, as described herein, the extent release module 206 may direct the secondary computing device 110 to release extents in a secondary storage device 114 of the secondary computing device 110 that correspond to free extents in a primary storage device 106 of the primary computing device 102. Additionally, as described herein, the synchronization module 208 may synchronize data stored on the secondary storage device 114 and the primary storage device 106.

In certain embodiments, the suspension detection module 202 may be configured to determine that a communicative relationship between the primary computing device 102 and the secondary computing device 110 is in a suspended state. For example, the primary computing device 102 and the secondary computing device 110 may typically be in a communicative relationship. In this relationship, the secondary computing device 110 and the primary computing device 102 may communicate with one another to synchronize the data stored on the primary storage device 106 and the secondary storage device 114. At times, the communicative relationship between the secondary computing device 110 and the primary computing device 102 may be interrupted such that the primary computing device 102 may be temporarily unable to communicate with the secondary computing device 110. For example, the communicative path between the primary computing device 102 and the secondary computing device 110 may become disabled, the secondary computing device 110 may also become temporarily unable to communicate with the primary computing device 102, or other cause resulting in an interruption of the communicative relationship between the primary computing device 102 and the secondary computing device 110.

In some embodiments, the suspension detection module 202 may be able to determine that the communicative relationship between the primary computing device 102 and the secondary computing device 110 is temporarily interrupted. For example, the primary computing device 102 may attempt to communicate with the secondary computing device 110 in such a way that the secondary computing device 110 acknowledges the communications from the primary computing device 102. If the primary computing device 102 fails to receive an acknowledgment from the secondary computing device 110 in response to a message sent from the primary computing device 102, the suspension detection module 202 may determine that the communicative relationship between the primary computing device 102 and the secondary computing device 110 is in a suspended state. Alternatively, the secondary computing device 110 may communicate with the primary computing device 102, indicating that the communicative relationship between the primary computing device 100 to secondary computing device 110 may be temporarily interrupted for a designated amount of time. Upon reception of such a communication, the suspension detection module 202 may determine that the communicative relationship is suspended.

In further embodiments, the relationship resumption module 204 may be configured to determine when a suspended communicative relationship between the primary computing device 102 and the secondary computing device 110 resumes. For example, after the suspension detection module 202 determines that the communicative relationship between the primary computing device 102 and the secondary computing device 110 is in a suspended state, the relationship resumption module 204, executed on the primary computing device 102, may periodically transmit a message to the secondary computing device 110 to determine if the secondary computing device 110 is responsive to communications from the primary computing device 102. If the secondary computing device 110 responds to one of the transmitted messages, the relationship resumption module 204 may determine that the communicative relationship between the primary computing device 102 and the secondary computing device 110 has resumed. Alternatively, the relationship resumption module 204, executing on the primary computing device 102, may determine that a communicative relationship between the primary computing device 102 and the secondary computing device 110 has resumed when the primary computing device 102 receives a communication from the secondary computing device 110 after the suspension detection module 202 determines that a communicative relationship between the primary computing device 102 and the secondary computing device 110 is suspended.

In additional embodiments, the extent release module 206 may be configured to release allocated extents in the primary storage device 106 and the secondary storage device 114. For example, the extent release module 206 may be configured to release allocated extents in the primary storage device 106 when a communicative relationship between the primary computing device 102 and the secondary computing device 110 is suspended. In particular, as data stored in memory extents allocated to one or more of the volumes 126 becomes obsolete, the extent release module 206 may release the extents storing obsolete data back to the free memory pool of the primary storage device 106 while the communicative relationship between the primary computing device 102 and the secondary computing device 110 is suspended.

In further embodiments, when the relationship resumption module 204 determines that the communicative relationship between the primary computing device 102 and the secondary computing device 110 has resumed, the extent release module 206 may release extents on the secondary storage device 114 that correspond with free extents on the primary storage device 106. For example, the extent release module 206 may release extents on the secondary storage device 114 before data on the secondary storage device 114 is synchronized with the data on the primary storage device 106.

In some embodiments, the synchronization module 208 may be configured to synchronize data stored on the secondary storage device 114 with data stored on the primary storage device 106. As described above, the secondary computing device 110 may maintain a mirror image of data stored on the primary storage device 106 in the secondary storage device 114. In response to the extent release module 206 completing the release of extents on the secondary storage device 114 that correspond to free extents in the primary storage device 106, the synchronization module 208 may synchronize the data stored on the secondary storage device 114 with the data stored on the primary storage device 106. Accordingly, by synchronizing the data stored on the primary storage device 106 and the secondary storage device 114 upon completion of the releasing of free extents by the extent release module 206, the data stored in the volumes 124 may replicate the data stored in the volumes 126. Further, the extents allocated to the volumes 124 may replicate the extents allocated to the volumes 126.

Figure 3:
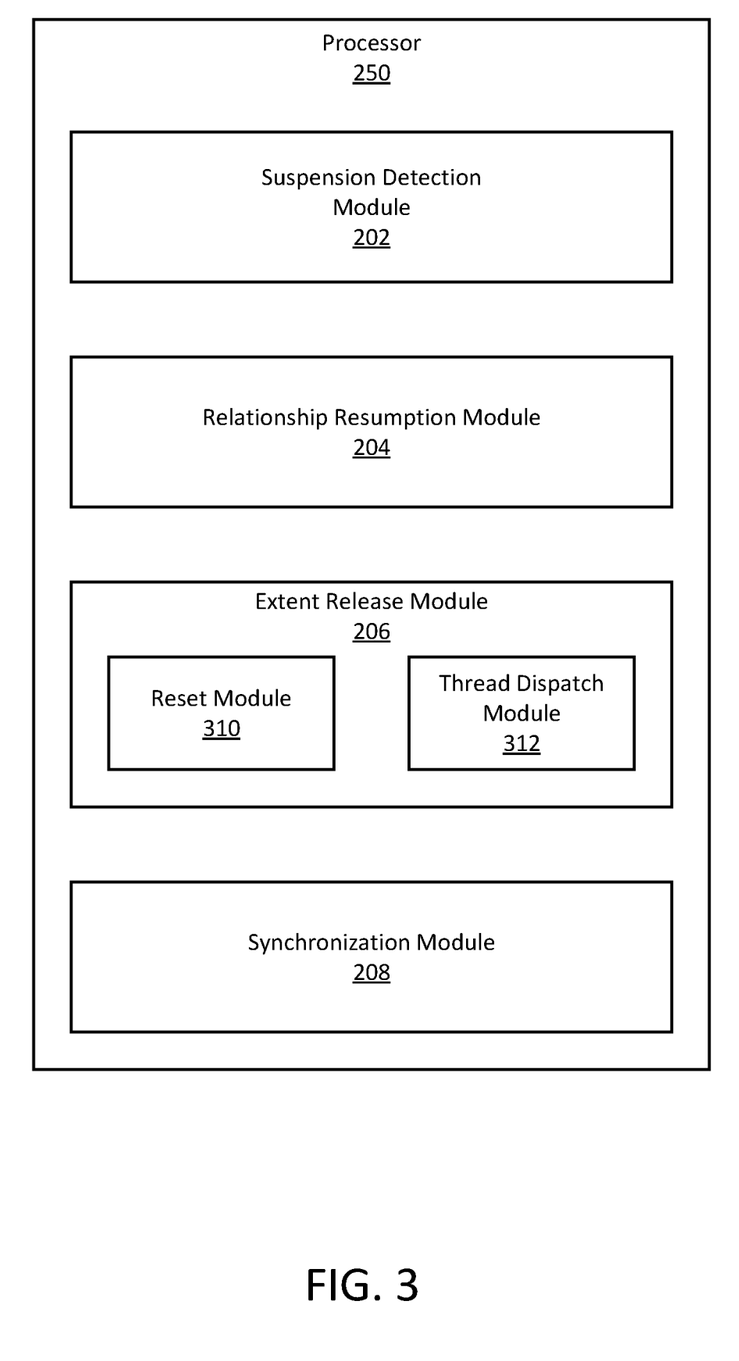
FIG. 3 is a block diagram illustrating a further embodiment of a processor configured to release space on a secondary storage device for resynchronization.

FIG. 3 is a block diagram illustrating a further embodiment of a processor 250 configured to release space on a secondary computing device 110 for resynchronization. The processor 250, in various embodiments, may be substantially similar to the processor 250 described above with regards to FIG. 2. In the depicted embodiment, the processor 250 may include a suspension detection module 202, a relationship resumption module 204, an extent release module 206, and a synchronization module 208, which may be configured substantially similar as described above with regards to the suspension detection module 202, the relationship resumption module 204, the extent release module 206, and the synchronization module 208. Additionally, the extent release module 206 may include a reset module 310 and a thread dispatch module 312. As described herein, the reset module 310 may reset one or more extent records associated with the released extents in the primary storage device. Further, as described herein, the thread dispatch module 312 may dispatch an asynchronous thread to release the extents in the secondary storage device.

In some embodiments, the reset module 310 may maintain extent records associated with the extents on the primary storage device 106 and the secondary storage device 114. As used herein, an extent record may refer to a data structure that stores information describing one or more characteristics of extents on a storage device. For example, an extent record maintained by the reset module 310 may be an out-of-synchronization (OOS) record, such as an OOS bitmap, that indicates which extents of the primary storage device 106 store data that is not synchronized with corresponding extents of the secondary storage device 114. For example, when the extent record is an OOS record and the communicative relationship between the primary computing device 102 and the secondary computing device 110 is suspended, the reset module 310 may identify records in the OOS record that are associated with extents that were released by the extent release module 206. After identifying that the records in the OOS record associated with the released extents, the reset module 310 may then reset the records associated with the released extents, such that the OOS record no longer indicates that the released extent is out-of-synchronization with a corresponding extent on the secondary storage device 114.

In certain embodiments, when the relationship resumption module 204 determines that a communicative relationship has resumed between the primary computing device 102 and the secondary computing device 110, the thread dispatch module 312 dispatches a thread on the primary computing device 102 that identifies free extents on the primary storage device 106. The primary computing device 100 to then communicates the free extents to the secondary computing device 110. The dispatched thread then releases extents on the secondary storage device 114 that correspond to the free extents on the primary storage device 106. In some embodiments, to release extents in the secondary storage device 114 the thread executing on the primary computing device 102 may send commands to the secondary computing device 110, instructing the secondary computing device 110 to release the indicated extents. Alternatively, the thread dispatch module 312 dispatches corresponding threads on both the primary computing device 102 and the secondary computing device 110. The thread executing on the primary computing device 102 may communicate a listing of the free extents to the secondary computing device 110, where the thread executing on the secondary computing device 110 identifies extents on the secondary storage device 114 that correspond to free extents on the primary storage device 106 that are not free on the secondary storage device 114. The thread computing on the secondary computing device 110 may then release the extents on the secondary storage device 114 that correspond to free extents on the primary storage device 106. When the free extents on the secondary storage device 114 correspond to the free extents on the primary storage device 106, the threads executing on the primary computing device 102 and the secondary computing device 110 may determine that the free extents match on the primary storage device 106 and the secondary storage device 114. The dispatched threads may then finish executing, whereupon the synchronization module 208 synchronizes the data stored on the primary storage device 106 with the data stored on the secondary storage device 114.

Figure 4:
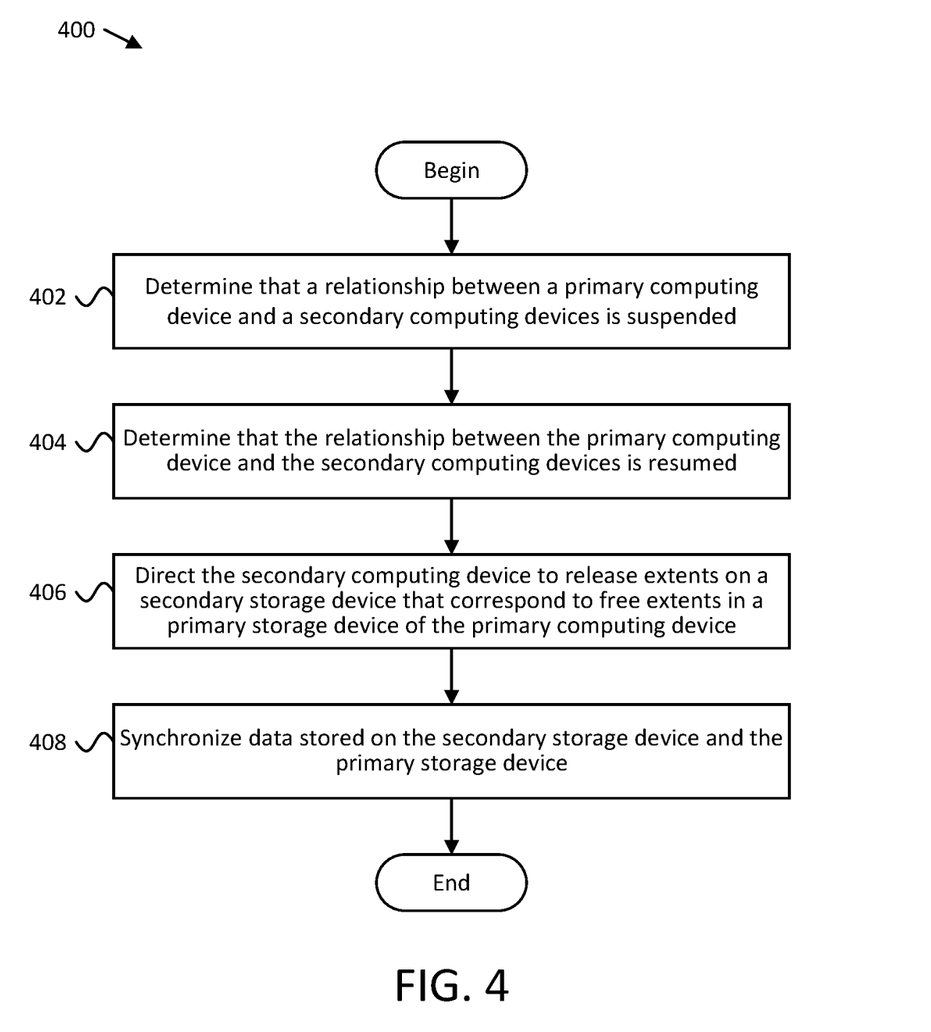
FIG. 4 is a flowchart diagram illustrating one embodiment of a method for releasing space on a secondary storage device for resynchronization.

FIG. 4 is a flowchart diagram illustrating one embodiment of a method 400 for releasing space on a secondary storage device 114 for resynchronization. In certain embodiments, method 400 begins at 402, where a relationship between a primary and secondary computing devices is determined to be suspended. Method 400 then proceeds at 404, where the relationship between the primary and secondary computing devices is determined to be resumed. Additionally, method 400 then proceeds at 406, where the secondary computing device 110 is directed to release extents on a secondary storage device 114 that correspond to free extents in a primary storage device 106. Further, method 400 proceeds at 408, where data stored on the secondary storage device 114 and the primary storage device 102 is synchronized. Method 400 then ends.

Figure 5:
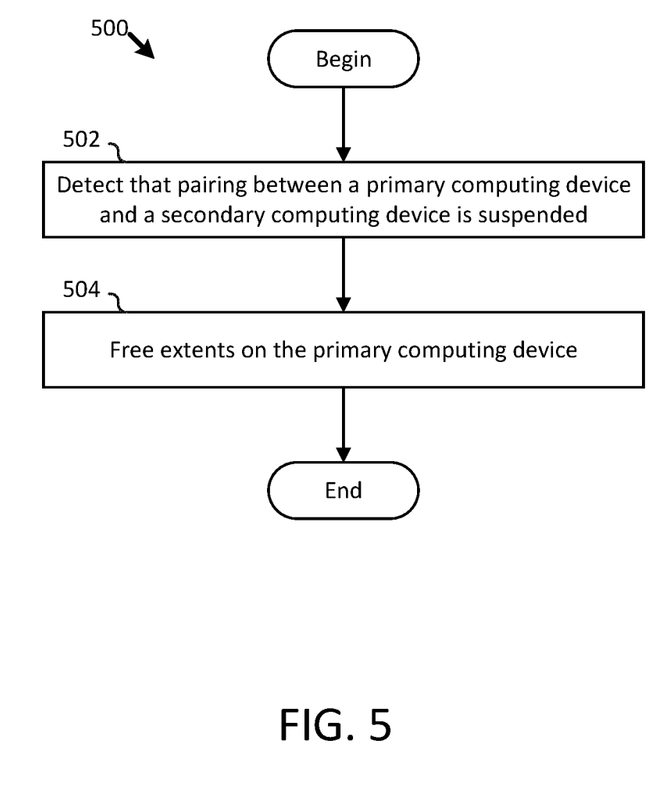
FIG. 5 is a flowchart diagram illustrating one embodiment of a method for releasing space on a primary storage device during suspension of a relationship between a primary computing device and a secondary computing device.

FIG. 5 is a flowchart diagram illustrating one embodiment of a method 500 for releasing space on a primary storage device 106 during suspension of a relationship between the primary computing device 102 and a secondary computing device 110. Method 500 proceeds at 502, where the pairing between a primary computing device 102 and a secondary computing device 110 is suspended. Additionally, method 500 proceeds at 504, where extents on the primary storage device 106 are released.

Figure 6:
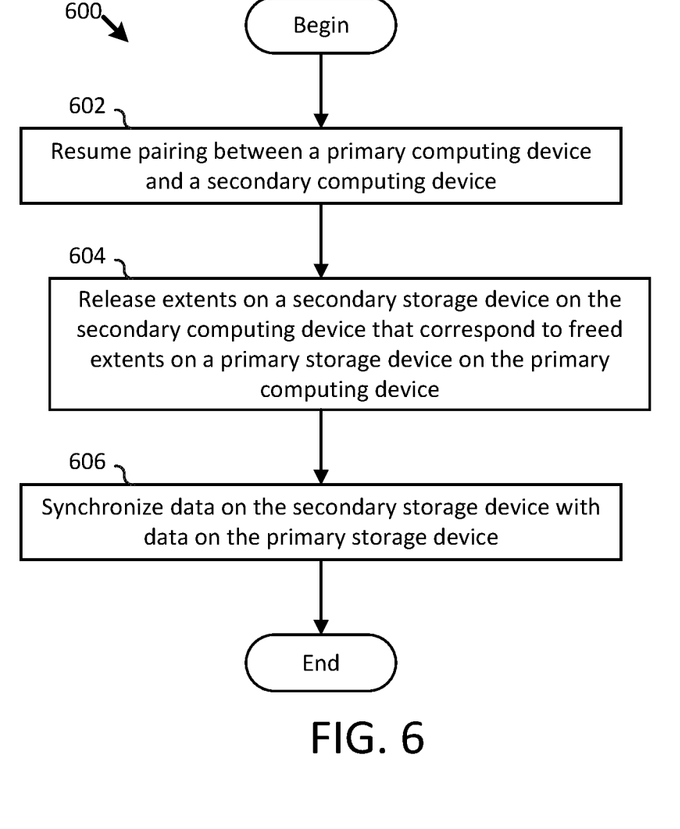
FIG. 6 is a flowchart diagram illustrating one embodiment of a method for releasing space on a secondary storage device after resumption of a relationship between a primary computing device and a secondary computing device.

FIG. 6 is a flowchart diagram illustrating one embodiment of a method 600 for releasing space on a secondary storage device 114 after resumption of a relationship between the primary computing device 102 and the secondary computing device 110. Method 600 proceeds at 602, where a pairing between a primary computing device 102 and the secondary computing device 110 is resumed. Further, method 600 proceeds at 604, where extents are released on a secondary storage device 114 on the secondary computing device 110 that correspond to free extents on a primary storage device 106 on the primary computing device 102. Additionally, the method 600 proceeds at 606, where data is synchronized on the secondary storage device 114 with data on the primary storage device 106.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
   a suspension detection module that determines that a relationship between a primary computing device and a secondary computing device is suspended;
   a relationship resumption module that determines that the relationship between the primary computing device and the secondary computing device is resumed;
   an extent release module that directs the secondary computing device to release extents in a secondary storage device of the secondary computing device that correspond to free extents in a primary storage device of the primary computing device; and
   a synchronization module that synchronizes data stored on the secondary storage device and the primary storage device.

2. The system of claim 1, wherein the extent release module is further configured to release extents in the primary storage device in response to the relationship being suspended.

3. The system of claim 2, wherein the extent release module is further configured to reset one or more extent records associated with the released extents in the primary storage device.

4. The system of claim 3, wherein an extent record in the one or more extent records indicates that an extent on the primary storage device is out-of-synchronization with a corresponding extent on the secondary storage device.

5. The system of claim 1, wherein the extent release module dispatches a thread to release the extents in the secondary storage device.

6. The system of claim 5, wherein the synchronization module synchronizes the data stored on the secondary storage device and the primary storage device upon execution completion of the thread.

7. The system of claim 1, wherein data stored on the extents on the primary storage device and the secondary storage device are associated with thin provisioned volumes.

8. A method comprising:
   determining that a relationship between a primary computing device and a secondary computing device is suspended;
   determining that the relationship between the primary computing device and the secondary computing device is resumed;
   directing the secondary computing device to release extents in a secondary storage device of the secondary computing device that correspond to free extents in a primary storage device of the primary computing device; and
   synchronizing data stored on the secondary storage device and the primary storage device.

9. The method of claim 8, further comprising releasing extents in the primary storage device in response to the relationship being suspended.

10. The method of claim 9, further comprising resetting one or more extent records associated with the released extents in the primary storage device.

11. The method of claim 10, wherein an extent record in the one or more extent records indicates that an extent on the primary storage device is out-of-synchronization with a corresponding extent on the secondary storage device.

12. The method of claim 8, further comprising dispatching a thread to release the extents in the secondary storage device.

13. The method of claim 12, further comprising synchronizing the data stored on the secondary storage device and the primary storage device upon execution completion of the thread.

14. The method of claim 8, wherein data stored on the extents on the primary storage device and the secondary storage device are associated with thin provisioned volumes.

15. A computer program product comprising a computer-readable storage medium including program instructions embodied therewith, the program instructions executable by a processor to cause the processor to:

determine that a relationship between a primary computing device and a secondary computing device is suspended;

determine that the relationship between the primary computing device and the secondary computing device is resumed;

direct the secondary computing device to release extents in a secondary storage device of the secondary computing device that correspond to free extents in a primary storage device of the primary computing device; and synchronize data stored on the secondary storage device and the primary storage device.

16. The computer program product of claim 15, the program instructions further causing the processor to release extents in the primary storage device in response to the relationship being suspended.

17. The computer program product of claim 16, the program instructions further causing the processor to reset one or more extent records associated with the released extents.

18. The computer program product of claim 17, wherein an extent record in the one or more extent records indicates that an extent on the primary storage device is out-of-synchronization with a corresponding extent on the secondary storage device.

19. The computer program product of claim 15, the program instructions further causing the processor to dispatch an thread to release the extents in the secondary storage device.

20. The computer program product of claim 19, the program instructions further causing the processor to synchronize the data stored on the secondary storage device and the primary storage device upon execution completion of the thread.

* * * * *